United States Patent
Jones et al.

(10) Patent No.: US 10,054,944 B2
(45) Date of Patent: Aug. 21, 2018

(54) SYSTEM AND METHOD FOR CONFIGURING AUTONOMOUS VEHICLE RESPONSES BASED ON A DRIVER PROFILE

(71) Applicant: JAGUAR LAND ROVER LIMITED, Warwickshire (GB)

(72) Inventors: Matt Jones, Portland, OR (US); Peter Bontrager, Portland, OR (US); Sebastian Paszkowicz, Portland, OR (US); Paul Wheller, Portland, OR (US)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 98 days.

(21) Appl. No.: 15/088,387

(22) Filed: Apr. 1, 2016

(65) Prior Publication Data

US 2017/0285639 A1     Oct. 5, 2017

(51) Int. Cl.
*B60W 30/16*     (2012.01)
*G05D 1/00*     (2006.01)
*B60W 30/08*     (2012.01)

(52) U.S. Cl.
CPC .......... *G05D 1/0088* (2013.01); *B60W 30/08* (2013.01); *B60W 2540/28* (2013.01);
(Continued)

(58) Field of Classification Search
CPC ....... B60W 40/08; G01C 21/36; G01C 21/34; G05D 1/008
(Continued)

(56) References Cited

U.S. PATENT DOCUMENTS 6,026,347 A * 2/2000 Schuster .................. B62D 1/28
                                                            180/167
6,150,932 A * 11/2000 Kenue ................ B60K 31/0008
                                                            340/435

(Continued)

FOREIGN PATENT DOCUMENTS

GB         2523232 A      8/2015
WO    2005/027077 A2     3/2005

OTHER PUBLICATIONS

Combined Search and Examination Report under Sections 17 and 18(3) for Application No. GB1616888.2 dated Mar. 13, 2017.

*Primary Examiner* — Thomas G Black
*Assistant Examiner* — Wae L Louie
(74) *Attorney, Agent, or Firm* — Carlson, Gaskey & Olds (57) ABSTRACT

An illustrative example system for developing an autonomous vehicle response includes a simulator that provides an at least visual simulation of a plurality of different situations that may be encountered while driving, a driver input device that allows the driver to respond to the simulation of the plurality of situations in a manner consistent with the driver's driving response to the situations, respectively, and a compute device including at least one processor and data storage associated with the processor. The compute device is configured to determine a profile of the driver based on information from the driver input device regarding the driver's driving responses to the simulation of the situations. The profile is at least temporarily stored in the data storage. The profile provides information for controlling the autonomous vehicle response to an actual situation corresponding to at least one of the simulated situations.

22 Claims, 3 Drawing Sheets (52) U.S. Cl.
CPC ..... *B60W 2540/30* (2013.01); *B60W 2550/10* (2013.01); *G05D 2201/0213* (2013.01)

(58) Field of Classification Search
USPC ......... 701/36, 37, 301, 408, 411; 705/14.49, 705/26.8
See application file for complete search history.

(56) References Cited

U.S. PATENT DOCUMENTS

| | | | |
|---|---|---|---|
| 8,150,621 B1* | 4/2012 | Phillips | G05D 1/0206 701/411 |
| 9,381,916 B1* | 7/2016 | Zhu | B60W 30/0956 |
| 9,714,036 B2* | 7/2017 | Yamaoka | B60W 30/182 |
| 9,751,534 B2* | 9/2017 | Fung | G06F 19/345 |
| 2002/0111172 A1* | 8/2002 | DeWolf | G06Q 30/02 455/456.3 |
| 2011/0106339 A1* | 5/2011 | Phillips | G05D 1/0033 701/2 |
| 2011/0178702 A1* | 7/2011 | Lassesson | G01C 21/34 701/408 |
| 2013/0151074 A1* | 6/2013 | Takeuchi | B60W 10/06 701/37 |
| 2013/0198031 A1* | 8/2013 | Mitchell | G01C 21/3476 705/26.8 |
| 2015/0158486 A1 | 6/2015 | Healey et al. | |
| 2015/0278855 A1* | 10/2015 | Khoury | G06Q 30/0251 705/14.49 |
| 2016/0001781 A1* | 1/2016 | Fung | G06F 19/345 701/36 |
| 2016/0343247 A1* | 11/2016 | Strassberger | B60W 30/16 |
| 2017/0039871 A1* | 2/2017 | Harkness | G09B 9/052 |
| 2017/0050638 A1* | 2/2017 | Gordon | B60W 30/16 |
| 2017/0050642 A1* | 2/2017 | Heckmann | B60W 50/08 |
| 2017/0088143 A1* | 3/2017 | Goldman-Shenhar | B60K 35/00 |
| 2017/0110022 A1* | 4/2017 | Gulash | G09B 9/052 |
| 2017/0132117 A1* | 5/2017 | Stefan | G06F 11/3684 |
| 2017/0240183 A1* | 8/2017 | Suzuki | B60W 40/08 |
| 2017/0242428 A1* | 8/2017 | Pal | H04W 4/90 |
| 2017/0255966 A1* | 9/2017 | Khoury | G08G 1/0129 |

* cited by examiner

SYSTEM AND METHOD FOR CONFIGURING AUTONOMOUS VEHICLE RESPONSES BASED ON A DRIVER PROFILE

TECHNICAL FIELD

The present disclosure relates to controlling an autonomous vehicle and, in particular but without limitation, to controlling autonomous vehicle responses to various situations based on previously determined driver responses to similar situations. Aspects of the invention relate to a system, a vehicle and a method.

BACKGROUND

With technological advances, it is becoming increasingly possible to have autonomously driven automotive vehicles. Autonomously driven vehicles would provide a driver the option of yielding control over the movement of the vehicle to an electronic control system that uses information regarding the environment surrounding the vehicle to autonomously drive the vehicle. Depending on the vehicle, different levels of automation may be possible.

While automated control over a vehicle may present increased convenience to a driver it presents new challenges and difficulties to vehicle and control component manufacturers. A fully automated vehicle that is self-driving or self-governing may encounter situations that require controlling the vehicle based on a moral or ethical decision. For example, while autonomous vehicle control may be designed to avoid collisions it is possible for a vehicle to be traveling and encounter a situation in which it becomes impossible to avoid a collision with one of several possible obstacles. There may eventually be standards developed for how such vehicles will behave in at least some such situations but as of today there are no guidelines or regulations in place. Vehicle and control component manufacturers, therefore, need to determine how to configure an autonomous vehicle response to such situations.

SUMMARY OF THE INVENTION

Aspects and embodiments of the invention provide a system, a method and a vehicle as claimed in the appended claims.

According to an aspect of the invention, there is provided a system for developing an autonomous vehicle response. An illustrative example system includes simulator means for providing an at least visual simulation of a plurality of different situations that may be encountered while driving. Driver input means allow the driver to respond to the simulation of the plurality of situations in a manner consistent with the driver's driving response to the situations, respectively. Profile determining means determine a profile of the driver based on information from the driver input means regarding the driver's driving responses to the simulation of the situations. The profile is at least temporarily stored by the profile determining means. The profile provides information for controlling the autonomous vehicle response to an actual situation corresponding to at least one of the simulated situations.

In an example embodiment having one or more features of the system of the previous paragraph, the system includes a communication means for communicating the driver profile to an autonomous vehicle controller on board a vehicle.

In an example embodiment having one or more features of the system of any of the previous paragraphs, the at least visual simulation comprises a virtual reality environment surrounding at least a portion of a vehicle.

In an example embodiment having one or more features of the system of any of the previous paragraphs, the driver input means comprises at least a portion of a simulated or actual vehicle interior including a steering wheel, an accelerator control, and a brake control.

In an example embodiment having one or more features of the system of any of the previous paragraphs, the driver input means generates an output indicative of driver manipulation of the steering wheel, accelerator control and brake control, respectively.

In an example embodiment having one or more features of the system of any of the previous paragraphs, the driver input means comprises at least one control that is configured to be manipulated by the driver in a manner that corresponds to the driving reaction to the simulated situations and at least one driver monitor that provides an indication of at least a direction of the driver's gaze.

In an example embodiment having one or more features of the system of any of the previous paragraphs, the simulator means provides a plurality of sets of individual situations that have related characteristics within the plurality of simulated situations, the individual situations in each of the sets are not identical, the profile determining means determines a plurality of portions of the driver profile corresponding to the plurality of sets, the portions respectively are based on common aspects of the driver's driving response to the individual situations in the corresponding set, and the portions respectively indicate a desired autonomous vehicle response to an actual situation having characteristics corresponding to the related characteristics of the corresponding set.

In an example embodiment having one or more features of the system of any of the previous paragraphs, different ones of the situations include different numbers of obstacles near the vehicle, the obstacles being situated relative to each other and relative to the vehicle such that the driver cannot avoid a collision between the vehicle and at least one of the obstacles.

In an example embodiment having one or more features of the system of any of the previous paragraphs, at least one of the obstacles is moving in the situation and at least one other of the obstacles is stationary in the situation.

In an example embodiment having one or more features of the system of any of the previous paragraphs, at least one of the obstacles represents a living being.

In an example embodiment having one or more features of the system of any of the previous paragraphs, different ones of the situations include different numbers of passengers inside the vehicle.

According to another aspect of the invention, there is provided a vehicle comprising the system of any of the previous paragraphs.

According to another aspect of the invention, there is provided a vehicle including a plurality of components that are useable to affect motion of the vehicle and autonomous driving mode control means for controlling operation of the components to automatically drive the vehicle. The autonomous driving mode control means includes a data storage containing at least one driver profile based on information regarding how at least one driver responded to a simulation of a plurality of situations similar to situations that may be encountered during motion of the vehicle. The profile provides information for the autonomous driving mode control means to use for controlling the components to achieve a vehicle response to an actual situation corresponding to at least one of the simulated situations.

An example embodiment having one or more features of the vehicle of any of the previous paragraphs includes at least one sensor means on the vehicle, the sensor means provides obstacle information to the autonomous driving mode control means regarding at least one obstacle in a vicinity of the vehicle. In such an example embodiment, the autonomous driving mode control means uses the obstacle information to determine a type of situation involving the obstacle, the autonomous driving mode control means determines a vehicle response to the determined type of situation based on information in the profile regarding how the at least one driver responded to at least one similar type of situation, and the autonomous driving mode control means controls at least one of the components to achieve the determined vehicle response.

An example embodiment having one or more features of the vehicle of any of the previous paragraphs includes at least one recognition means for providing an indication of an identification of an individual in a driver's seat of the vehicle. In such an example embodiment, the at least one driver profile comprises a plurality of driver profiles respectively corresponding to different individual drivers, the autonomous driving mode control means determines an identification of the individual in the driver's seat, the autonomous driving mode control means selects the one of the driver profiles corresponding to the determined identification, and the autonomous driving mode control means uses the selected one of the driver profiles for controlling the components in a situation corresponding to at least one of the situations in the profile.

According to another aspect of the invention, there is provided a method of developing an autonomous vehicle response including simulating a plurality of different situations that may be encountered while driving, determining a driver's driving response to the simulated plurality of situations, respectively, and determining a profile of the driver based on information regarding the driver's driving responses, the profile providing information for controlling the autonomous vehicle response to an actual situation corresponding to at least one of the simulated situations.

An example embodiment having one or more features of the method of any of the previous paragraphs includes providing the driver profile to an autonomous vehicle controller on board a vehicle.

In an example embodiment having one or more features of the method of any of the previous paragraphs, simulating the plurality of different situations comprises presenting a virtual reality environment surrounding at least a portion of a vehicle.

In an example embodiment having one or more features of the method of any of the previous paragraphs, the simulating includes a plurality of sets of individual situations that have related characteristics, the individual situations in each of the sets are not identical, determining the profile comprises determining a plurality of portions of the driver profile corresponding to the plurality of sets, the portions respectively are based on common aspects of the driver's driving response to the individual situations in the corresponding set, and the portions respectively indicate a desired autonomous vehicle response to an actual situation having characteristics corresponding to the related characteristics of the corresponding set.

In an example embodiment having one or more features of the method of any of the previous paragraphs, different ones of the situations include different numbers of obstacles near the vehicle, the obstacles being situated relative to each other and relative to the vehicle such that the driver cannot avoid a collision between the vehicle and at least one of the obstacles.

In an example embodiment having one or more features of the method of any of the previous paragraphs, at least one of the obstacles is moving in the situation and at least one other of the obstacles is stationary in the situation.

In an example embodiment having one or more features of the method of any of the previous paragraphs, at least one of the obstacles represents a living being.

In an example embodiment having one or more features of the method of any of the previous paragraphs, different ones of the situations include different numbers of passengers inside the vehicle.

According to another aspect of the invention, there is provided a vehicle comprising autonomous vehicle control means configured to perform the method of any of the previous paragraphs.

According to another aspect of the invention, there is provided a system for developing an autonomous vehicle response including a simulator that provides an at least visual simulation of a plurality of different situations that may be encountered while driving, a driver input device that allows the driver to respond to the simulation of the plurality of situations in a manner consistent with the driver's driving response to the situations, respectively, and a compute device including at least one processor and data storage associated with the processor. The compute device is configured to determine a profile of the driver based on information from the driver input device regarding the driver's driving responses to the simulation of the situations. The profile is at least temporarily stored in the data storage. The profile provides information for controlling the autonomous vehicle response to an actual situation corresponding to at least one of the simulated situations.

Within the scope of this document it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of this invention facilitate developing an autonomous vehicle response to correspond to how a particular driver would respond to a variety of potentially encountered situations that include an unavoidable collision with at least one obstruction or obstacle. A driver profile is determined based on the driver's response to a variety of simulated situations. The autonomous vehicle controller utilizes the driver profile for controlling the vehicle actual response to such a situation.

Figure 1:
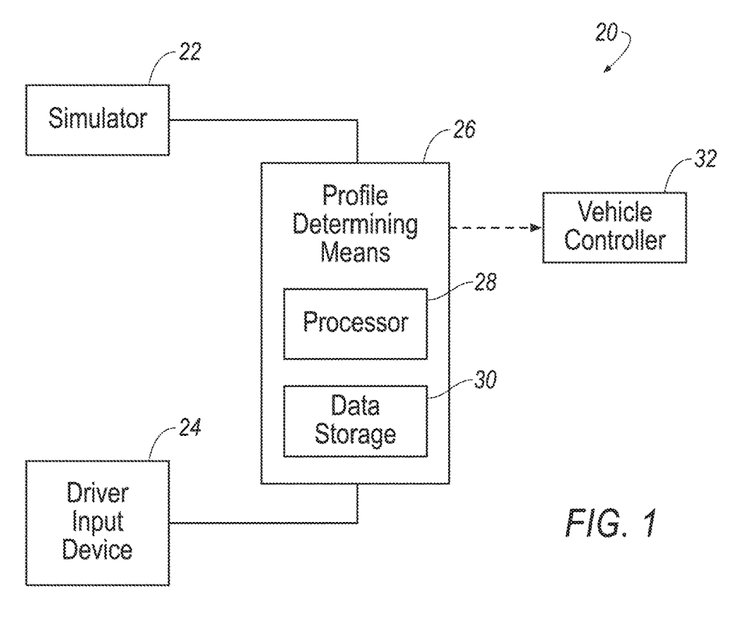
FIG. 1 schematically illustrates an example embodiment of a system designed according to an embodiment of this invention.

FIG. 1 schematically shows a system 20 for developing an autonomous vehicle response to various situations that may be encountered by such a vehicle. The system 20 includes simulator means 22, which in this example comprises a simulator device or system that provides an at least visual simulation of an environment surrounding a vehicle. In some examples the simulation may include audio. The simulator means 22 presents simulations of various situations that may be encountered while driving a vehicle and which require a driver response or reaction. The simulator means 22 in some embodiments includes known simulator devices and components, such as a computer and a display, that utilize customized programming, data, or both to provide a desired simulation experience. In some embodiments, the simulation is based on or includes a virtual reality environment surrounding at least a portion of a vehicle.

The system 20 includes driver input means 24 that allow a driver to respond to the simulation of the situations in a manner consistent with the driver's driving response to the situations, respectively.

Profile determining means 26 determine a driver profile based on information from the driver input means 24 regarding the driving reactions of the driver to the simulated situations. The example profile determining means 26 includes a compute device having at least one processor 28 and data storage 30 associated with the processor 28. The data storage 30 at least temporarily contains or stores the determined driver profile. The data storage 30 in this example also includes programming, data or both that is used by the processor 28 for determining the driver profile.

In some embodiments the processor 28 will control the simulator means 22 in addition to determining or generating the driver profile.

The profile determining means 26 has communication capabilities for providing a determined driver profile to an autonomous driving mode control means 32 that controls operation of a vehicle in an autonomous manner. The communication capability may be realized through a transceiver that communicates with the control means 32 over a wireless link, for example. Another communication capability includes the ability to store the driver profile on a portable memory device that can then be connected with the control means 32 to download the driver profile.

The control means 32 in this example includes at least one processor and data storage associated with the processor. The control means 32 includes programming or is otherwise particularly configured to effect autonomous driving of a vehicle at least sometimes based on the driver profile.

Figure 2:
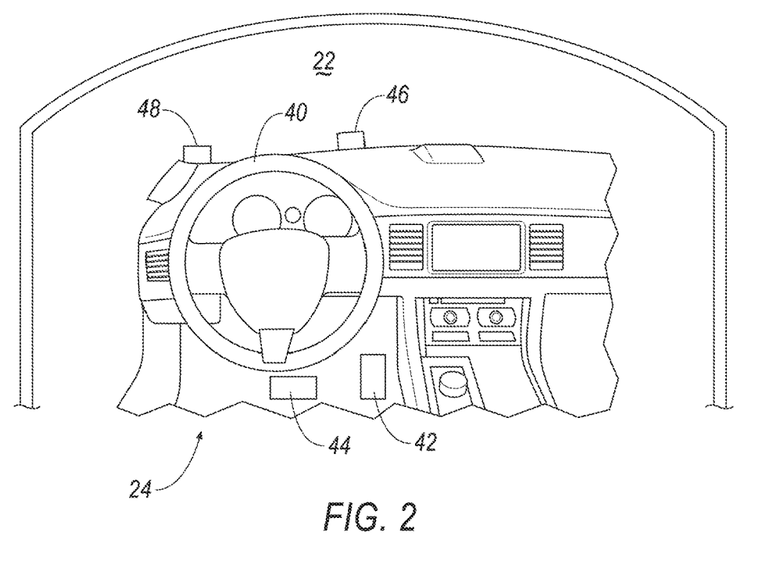
FIG. 2 illustrates selected portions of the system shown in FIG. 1.

FIG. 2 illustrates an example driver input means 24. In this example, the driver input means 24 is configured to resemble at least a portion of a vehicle interior. The driver input means 24 includes a plurality of driver input devices, which in this example include a steering wheel 40, an accelerator control 42 and a brake control 44. The accelerator control 42 and the brake control 44 are foot-actuated pedals in this example. The example embodiment includes a driver's seat (not illustrated) so the individual may simulate control of an actual vehicle during the simulation. The driver input devices are configured to provide or generate an output indicative of the driver's manipulation of each. For example, associated sensors or electronics (not illustrated) provide information regarding how a driver turns the steering wheel or applies the brakes as part of the driving response to situations presented during a simulation.

In FIG. 2, the simulator means 22 includes a viewing screen that generally surrounds the driver input means 24. Such a viewing screen provides a visual representation of an environment in a vicinity of a vehicle and various situations that may be encountered while driving. The images presented on the screen of the simulator 22 may be generated using known display techniques.

Other embodiments include virtual reality goggles (not illustrated) that can be worn by an individual participating the simulation process. Some such embodiments include other driver input devices that are different than those illustrated in FIG. 2. For example, a joy stick or other input device may be used by an individual to achieve simulated vehicle control responsive to situations presented during the simulation.

The embodiment of FIG. 2 includes sensors 46 and 48 for detecting selected aspects or features of the individual driver. The sensors 46 and 48 in this example include known components that are useful to detect various driver characteristics such as driver reaction, facial expression, attention, gaze, and posture. For example, at least one of the sensors 46 or 48 includes a camera situated to obtain information regarding a direction of driver attention or gaze during the simulation. Such information may be useful, for example, to filter out results or information regarding driving reactions that occur (or do not occur) in response to a simulated situation when the driver was not paying attention to or looking at one or more obstacles presented during the simulation. Information from the sensors 46 and 48 may also be useful in conjunction with information regarding movement of the steering wheel 40, for example, as part of the information used to determine a driver profile.

Information regarding various aspects of the driver's reaction may be useful to adjust a statistical relevance of a particular observed or detected driving reaction. For example, any reactions occurring without adequate driver attention to the presence of the obstacles prior to a simulated collision may be discounted, weighted to have less influence, or discarded when determining the driver profile.

Figure 3:
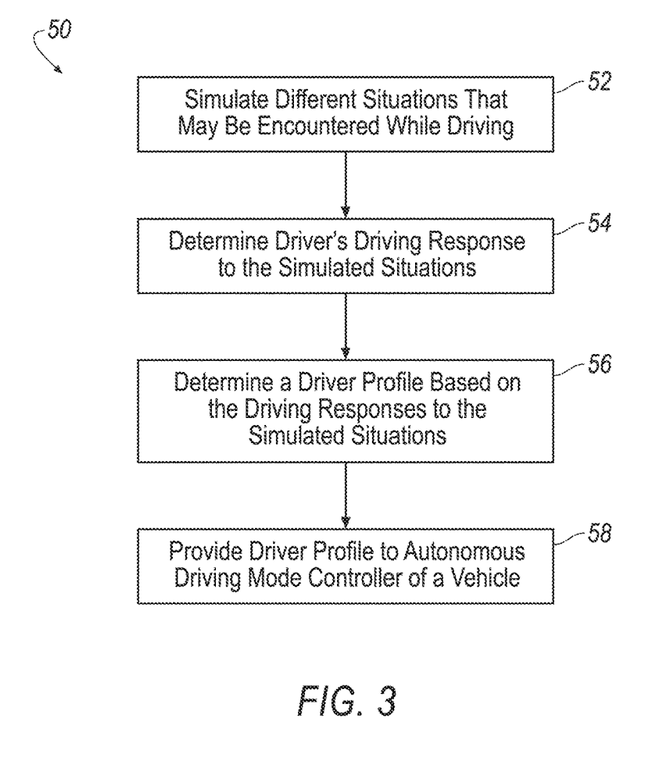
FIG. 3 is a flowchart diagram summarizing an example approach to developing an autonomous vehicle response to various situations.

FIG. 3 is a flow chart diagram 50 summarizing an example approach to developing an autonomous vehicle response to various situations that may be encountered by an autonomously driven vehicle. This example includes simulating different situations at 52 that may be encountered while driving. The situations in this example include circumstances that require an ethical or moral judgment or decision by the driver. For example, many of the situations presented during the simulation include multiple obstacles or obstructions that are situated relative to each other and the vehicle in a manner that makes it impossible for the vehicle to avoid a collision with at least one of the obstacles. In such a situation, the driver uses the driver input means 24 as the driver reacts to the simulated situation in a manner consistent with how the driver would react or respond if the situation were real. The driving response of the driver provides information to the profile determining means 26 regarding how the driver responds to the presented situation. Each response is associated with the type of situation that prompted the driving response.

Example situations include at least one stationary obstacle, such as a tree or a building, and at least one moving obstacle, such as another vehicle. Some simulated situations include living beings, such as a person or an animal, as at least one of the obstacles. The living being may be moving or stationary in the simulated situation. As those skilled in the art who have the benefit of this description will realize that there are a variety of situations that can be simulated with various levels of ethical or moral implications associated with the decision to collide with one of the obstacles.

Some embodiments include simulations of multiple situations having similar characteristics but different details. For example, one type of situation may include an animal moving into the pathway of the vehicle with one or more stationary objects as another obstacle. The simulator means 22 presents multiple such situations respectively including a different animal, different stationary objects, different driving conditions, and different speeds of animal movement. Another type of situation may include a pedestrian and an oncoming vehicle with the driver left to choose whether to avoid the pedestrian or the oncoming vehicle. Various such situations will be provided at 52.

Some variations on situations include conditions of the vehicle. For example, one type of situation involves the driver being alone in the vehicle while another type of situation includes at least one passenger in the vehicle. The driver may have different driving responses depending on whether someone else is in the vehicle.

In some embodiments the simulation includes sets of related situations that have common or similar characteristics. The driver profile includes different portions corresponding to the sets of situations. Each portion of the driver profile is based on common aspects of the driver's driving reaction to the individual situations in the corresponding set. The portions respectively indicate a desired autonomous vehicle response to an actual situation having characteristics corresponding to the related characteristics of the situations in the corresponding set.

Those skilled in the art who have the benefit of this description will be able to decide what types of situations to present during a simulation and how many of each type.

At 54, the driver's driving response to the simulated situations is determined based on the driver's use of the driver input means 24, such as the steering wheel 40, the accelerator control 42 and the brake control 44. The different driving reactions are associated with the corresponding simulated situation and used to determine the driver profile at 56. In some embodiments, the multiple situations of the same type provide pattern information regarding the driver's driving reactions that allows for basing the driver profile on more than a single incident. Some drivers may respond to some simulated situations differently than their typical reaction and using multiple, similar situations provides a driver profile more consistent with how the driver typically responds to such a situation or how the driver prefers to respond to such a situation.

One feature of this example embodiment is that it makes it possible to determine a driver profile at 56 for a particular driver that indicates the driver's preferred or typical responses to a variety of situations involving a dilemma over which way to direct the vehicle when some collision is inevitable. Some embodiments include known statistical modeling techniques for developing the driver profile based on the driving reactions that were observed or detected during simulated situations. The driver profile is at least temporarily stored in the data storage 30 in some embodiments.

In some embodiments the driver profile includes general tendencies of the driver such as typical acceleration rates, braking patterns, and lane changing tendencies. This type of information may be included in a driver profile for autonomous vehicle control that corresponds to the driver's normal or typical tendencies or driving style during typical driving conditions without requiring any ethical or moral decisions or judgment calls.

At 58 the driver profile is provided to the autonomous vehicle controller 32 of that driver's vehicle. The controller will subsequently use the driver profile to control vehicle operation when the vehicle encounters actual situations, which correspond to simulated situations. This feature allows a vehicle manufacturer or an autonomous driving component manufacturer to avoid adopting or implementing standard, pre-selected autonomous vehicle responses to such situations. Instead, the driver profile is based on actual behavior of the individual vehicle owner or driver during a simulation. Using that driver profile as a basis for controlling the actual vehicle response provides a response that corresponds to how the driver would have reacted to such a situation. This approach allows for the driver to effectively influence a judgment call that has to be made by the autonomous driving controller 32.

Figure 4:
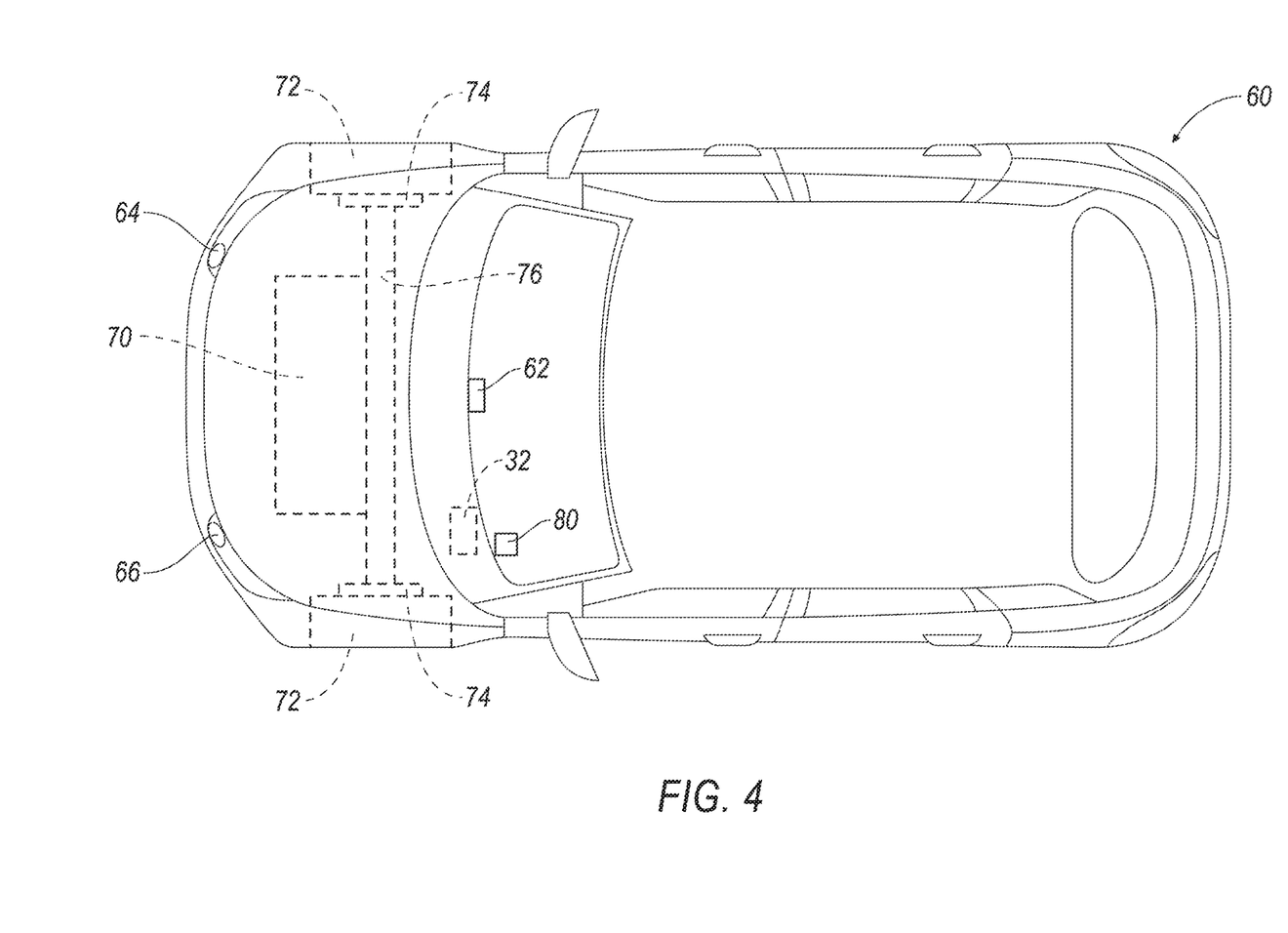
FIG. 4 schematically illustrates an example vehicle designed according to an embodiment of this invention.

FIG. 4 illustrates an example embodiment of a vehicle 60 that may be autonomously driven. The vehicle 60 includes known sensors 62, 64, 66 to provide the autonomous driving mode control means 32 with information regarding the environment near the vehicle 60. For example, the sensors 66 and 64 may be ultrasound or radar detectors that provide information regarding an obstacle or obstruction in a path of the vehicle 60. The sensor 62 in the illustrated example is a camera that provides video or image information to the control means 32.

The vehicle 60 includes several components that can be controlled by the control means 32 to autonomously drive the vehicle. Example components that are schematically shown in FIG. 4 include an engine 70, wheels 72 that can be steered, brakes 74 and a transmission 76. Other components may be controlled by the control means 32 according to the needs of a particular embodiment or situation. The control means 32 controls the operation or status of such components based on information from the driver profile when a situation is encountered that corresponds to a type of situation addressed by the driver profile.

The example vehicle 60 includes at least one driver recognition device 80 that is configured to determine an identity of the driver of the vehicle. An example driver recognition device includes a camera that captures an image of an individual in the driver's seat. Another example driver recognition device obtains information from an electronic signaling device, such as a key fob, an RFID tag or a smart phone that is assigned to a particular driver. Other recognition devices may be used instead of or in combination with such recognition devices.

If the control means 32 has multiple driver profiles, the driver recognition device 80 provides information that allows the control means to select the driver profile of the current driver. This feature allows a single vehicle to have multiple, different responses to a particular type of situation depending on who is currently in the driver's seat of the vehicle.

Figure 5:
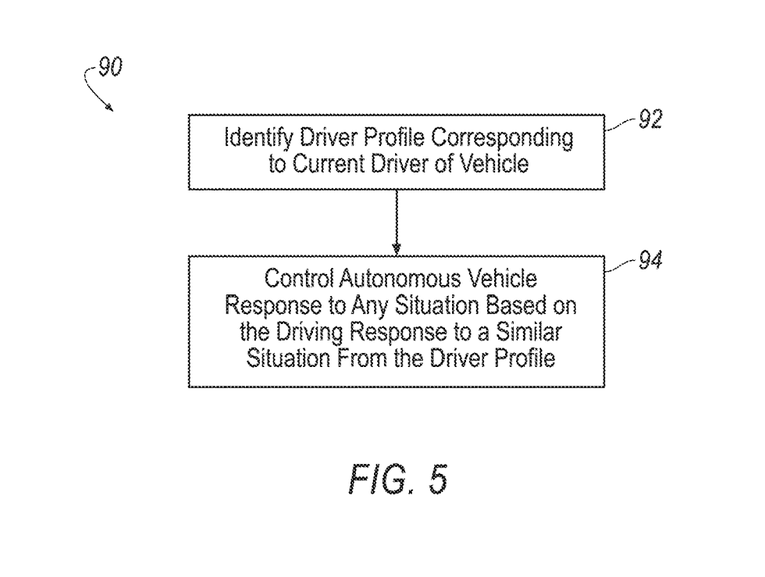
FIG. 5 is a flowchart diagram summarizing an example approach to controlling an autonomous vehicle according to an embodiment of this invention.

FIG. 5 is a flow chart diagram 90 that summarizes an example approach to control such a vehicle. At 92 the control means 32 identifies the driver and a driver profile corresponding to the identified driver. At 94 the control means 32 controls one or more of the components 70-76 in response to a situation encountered by the vehicle 60 based on the driving response to a similar or corresponding situation from the currently selected driver profile.

The embodiments discussed above facilitate developing a customized autonomous vehicle response to various potential driving situations according to the way in which the vehicle owner or current driver would respond to such a situation.

The preceding description is illustrative rather than limiting in nature. Variations and modifications to the disclosed examples may become apparent to those skilled in the art that do not necessarily depart from the essence of the contribution to the art provided by the disclosed embodiments. The scope of legal protection can only be determined by studying the following claims.

I claim:

1. A system for developing an autonomous vehicle response, the system comprising:
a simulator configured to provide an at least visual simulation of a plurality of different situations that may be encountered by a driver while driving;
a driver input configured to allow the driver to respond to the simulation of the plurality of situations in a manner consistent with the driver's driving response to the situations, respectively; and
a processor configured to determine a profile of the driver based on information from the driver input means regarding the driver's driving responses to the simulation of the situations, the profile being at least temporarily stored by the processor, the profile providing information for controlling the autonomous vehicle response to an actual situation corresponding to at least one of the simulated situations.

2. The system of claim 1, wherein the processor is configured to communicate the driver profile to an autonomous vehicle controller on board a vehicle.

3. The system of claim 1, wherein the at least visual simulation comprises a virtual reality environment surrounding at least a portion of a vehicle.

4. The system of claim 1, wherein the driver input comprises at least a portion of a simulated or actual vehicle interior including a steering wheel, an accelerator control, and a brake control.

5. The system of claim 4, wherein the driver input generates an output indicative of driver manipulation of the steering wheel, accelerator control and brake control, respectively.

6. The system of claim 1, wherein the driver input comprises
at least one control that is configured to be manipulated by the driver in a manner that corresponds to the driving response to the simulated situations; and
at least one driver monitor that provides an indication of at least a direction of the driver's gaze.

7. The system of claim 1, wherein
the simulator is configured to provide a plurality of sets of individual situations that have related characteristics within the plurality of simulated situations;
the individual situations within each of the sets are not identical;
the processor is configured to determine a plurality of portions of the driver profile corresponding to the plurality of sets;
the portions respectively are based on common aspects of the driver's driving response to the individual situations in the corresponding set; and
the portions respectively indicate a desired autonomous vehicle response to an actual situation having characteristics corresponding to the related characteristics of the corresponding set.

8. The system of claim 7, wherein different ones of the situations include different numbers of obstacles near the vehicle, the obstacles being situated relative to each other and relative to the vehicle such that the driver cannot avoid a collision between the vehicle and at least one of the obstacles.

9. The system of claim 8, wherein at least one of the obstacles is moving in the situation and at least one other of the obstacles is stationary in the situation.

10. The system of claim 8, wherein at least one of the obstacles represents a living being.

11. The system of claim 1, wherein different ones of the situations include different numbers of passengers inside the vehicle.

12. A vehicle comprising:
a plurality of components that are useable to affect motion of the vehicle; and
an autonomous driving mode controller configured to control operation of the components to automatically drive the vehicle, the autonomous driving mode controller including a data storage containing at least one driver profile based on information regarding how at least one driver responded to a simulation of a plurality of situations similar to situations that may be encountered during motion of the vehicle, the profile providing information for the autonomous driving mode controller to use for controlling the components to achieve a vehicle response to an actual situation corresponding to at least one of the simulated situations.

13. The vehicle of claim 12, comprising
at least one sensor on the vehicle, the sensor providing obstacle information to the autonomous driving mode controller regarding at least one obstacle in a vicinity of the vehicle; and
wherein
the autonomous driving mode controller uses the obstacle information to determine a type of situation involving the obstacle;
the autonomous driving mode controller determines a vehicle response to the determined type of situation based on information in the driver profile regarding how the at least one driver responded to at least one similar type of situation; and
the autonomous driving mode controller controls at least one of the components to achieve the determined vehicle response.

14. The vehicle of claim 12, comprising at least one sensor that provides an indication of an identification of an individual in a driver's seat of the vehicle; and
wherein
the at least one driver profile comprises a plurality of driver profiles respectively corresponding to different individual drivers;
the autonomous driving mode controller determines an identification of the individual in the driver's seat;

the autonomous driving mode controller selects the one of the driver profiles corresponding to the determined identification; and the autonomous driving mode controller uses the selected one of the driver profiles for controlling the components in a situation corresponding to at least one of the situations in the profile.

15. A method of developing an autonomous vehicle response, the method comprising:

simulating a plurality of different situations that may be encountered while driving;

determining a driver's driving response to the simulated plurality of situations, respectively; and determining a profile of the driver based on information regarding the driver's driving responses, the profile providing information for controlling the autonomous vehicle response to an actual situation corresponding to at least one of the simulated situations.

16. The method of claim 15, comprising providing the driver profile to an autonomous vehicle controller on board a vehicle.

17. The method of claim 15, wherein simulating the plurality of different situations comprises presenting a virtual reality environment surrounding at least a portion of a vehicle.

18. The method of claim 15, wherein the simulating includes a plurality of sets of individual situations that have related characteristics;

the individual situations in each of the sets are not identical;

determining the profile comprises determining a plurality of portions of the driver profile corresponding to the plurality of sets;

the portions respectively are based on common aspects of the driver's driving response to the individual situations in the corresponding set; and the portions respectively indicate a desired autonomous vehicle response to an actual situation having characteristics corresponding to the related characteristics of the corresponding set.

19. The method of claim 15, wherein different ones of the situations include different numbers of obstacles near the vehicle, the obstacles being situated relative to each other and relative to the vehicle such that the driver cannot avoid a collision between the vehicle and at least one of the obstacles.

20. The method of claim 19, wherein at least one of the obstacles is moving in the situation and at least one other of the obstacles is stationary in the situation.

21. The method of claim 19, wherein at least one of the obstacles represents a living being.

22. The method of claim 15, wherein different ones of the situations include different numbers of passengers inside the vehicle.

* * * * *